United States Patent
Nishizawa et al.

(10) Patent No.: US 8,455,375 B2
(45) Date of Patent: Jun. 4, 2013

(54) GLASS PLATE FOR DISPLAY PANELS, PROCESS FOR PRODUCING IT, AND PROCESS FOR PRODUCING TFT PANEL

(75) Inventors: Manabu Nishizawa, Tokyo (JP); Yuya Shimada, Tokyo (JP); Yuichi Kuroki, Tokyo (JP); Kei Maeda, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 118 days.

(21) Appl. No.: 12/883,236

(22) Filed: Sep. 16, 2010

(65) Prior Publication Data

US 2011/0003483 A1 Jan. 6, 2011

Related U.S. Application Data

(63) Continuation of application No. PCT/JP2009/057675, filed on Apr. 16, 2009.

(30) Foreign Application Priority Data

Apr. 21, 2008 (JP) ................................. 2008-110161

(51) Int. Cl.
*H01L 21/00* (2006.01)
*C03C 3/087* (2006.01)

(52) U.S. Cl.
USPC ............................................. 438/800; 501/69

(58) Field of Classification Search
USPC ...................... 438/800; 501/69, 70
See application file for complete search history.

(56) References Cited

U.S. PATENT DOCUMENTS 5,908,794 A 6/1999 Maeda et al.
6,313,052 B1 11/2001 Nakashima et al.

FOREIGN PATENT DOCUMENTS

| JP | 07-053230 | 2/1995 |
|---|---|---|
| JP | 09-249430 | 9/1997 |
| JP | 09-301733 | 11/1997 |
| JP | 10-72235 | 3/1998 |
| JP | 11-314933 | 11/1999 |
| JP | 2000-351649 | 12/2000 |
| JP | 2004/131314 | 4/2004 |
| JP | 2006-137631 | 6/2006 |
| JP | 2006-169028 | 6/2006 |
| WO | WO 2009/028570 A1 | 3/2009 |

OTHER PUBLICATIONS

The Extended European Search Report issued Jun. 15, 2011, in Application No. / Patent No. 09733944.4-1218 / 2277839 PCT/JP2009057675.
U.S. Appl. No. 13/243,641, filed Sep. 23, 2011, Nishizawa, et al.
U.S. Appl. No. 13/444,994, filed Apr. 12, 2012, Shimada, et al.
Office Action issued Sep. 21, 2012 in Chinese Application No. 200980114731.6 (With English Translation).

*Primary Examiner* — William D Coleman
(74) *Attorney, Agent, or Firm* — Oblon, Spivak, McClelland, Maier & Neustadt, L.L.P.

(57) ABSTRACT

To provide a glass plate for display panels which has a low $8_2O_3$ content and a low compaction and which can be used as a glass substrate for large TFT panels.
A glass plate for display panels, which comprises, as a glass matrix composition as represented by mass % based on oxide:
$SiO_2$ 50.0 to 73.0,
$Al_2O_3$ 6.0 to 20.0,
$B_2O_3$ 0 to 2.0,
$MgO$ 4.2 to 9.0,
$CaO$ 0 to 6.0,
$SrO$ 0 to 2.0,
$BaO$ 0 to 2.0,
$MgO+CaO+SrO+BaO$ 6.5 to 11.3,
$Li_2O$ 0 to 2.0,
$Na_2O$ 2.0 to 18.0,
$K_2O$ 0 to 13.0, and
$Li_2O+Na_2O+K_2O$ 8.0 to 18.0,
and has a heat shrinkage (C) of at most 20 ppm.

10 Claims, 1 Drawing Sheet

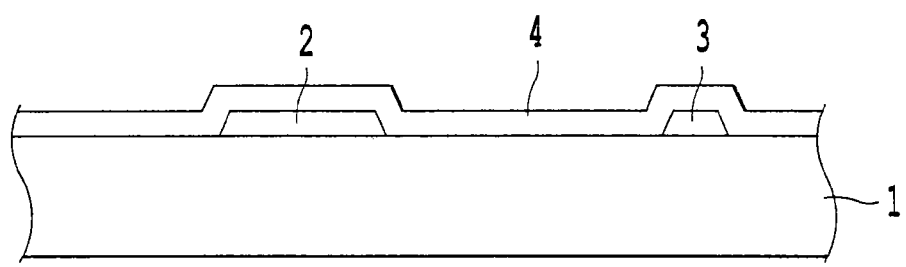

GLASS PLATE FOR DISPLAY PANELS, PROCESS FOR PRODUCING IT, AND PROCESS FOR PRODUCING TFT PANEL

TECHNICAL FIELD

The present invention relates to a glass plate for display panels to be used for various display panels such as a liquid crystal display (LCD) panel and a plasma display panel (PDP). The glass plate for display panels of the present invention is particularly suitable as a glass plate for an LCD panel.

BACKGROUND ART

Heretofore, as a glass substrate for an LCD panel, an alkali-free glass containing no alkali metal oxide has been used. The reason is that if an alkali metal oxide is contained in a glass substrate, alkali ions in the glass plate will be diffused into a semiconductor film of a thin film transistor (TFT) to be used for driving an LCD panel, during heat treatment carried out in a process for producing an LCD panel, thus leading to deterioration of the TFT characteristics.

Further, since an alkali-free glass has a low coefficient of thermal expansion and a high glass transition point (Tg), its dimensional change in a process for producing an LCD panel is small, and the influence over the display quality by thermal stress at the time of use of the LCD panel is small, and accordingly it is preferred as a glass substrate for an LCD panel.

However, an alkali-free glass has the following drawbacks in view of production.

An alkali-free glass has very high viscosity and is hardly molten, and its production involves technical difficulty.

Further, in general, an effect of a refining agent for an alkali-free glass is poor. For example, in a case where $SO_3$ is used as the refining agent, since the temperature at which $SO_3$ is decomposed and released as bubbles is lower than the glass melting temperature, the most part of $SO_3$ added is decomposed and volatilized from the molten glass before refining is carried out, and no sufficient refining effect will be achieved.

Use of an alkali glass substrate containing an alkali metal oxide as the glass substrate for TFT panels (for a-Si TFT panels) has been proposed (Patent Documents 1 and 2), since it becomes possible to carry out heat treatment in a process for producing a TFT panel at a relatively low temperature (about 250 to 300° C.) which has been carried out at from 350 to 450° C.

Since glass containing an alkali metal oxide generally has a high coefficient of thermal expansion, in order that it has a coefficient of thermal expansion preferred as a glass substrate for TFT panels, $B_2O_3$ having an effect to lower the coefficient of thermal expansion is usually contained (Patent Documents 1 and 2).

However, in the case of a glass composition containing $B_2O_3$, $B_2O_3$ is volatilized when the glass is melted particularly in a melting step and in a refining step, whereby the glass composition tends to be inhomogeneous. If the glass composition is inhomogeneous, flatness when the glass is formed into a plate shape tends to be influenced. A glass substrate for TFT panels is required to have high flatness so as to keep a constant distance between two sheets of glass sandwiching a liquid crystal i.e. cell gap, so as to secure the display quality. Accordingly, in order to secure a predetermined flatness, after glass is formed into plate glass by float process, the surface of the plate glass is polished. If no desired flatness of the plate glass after forming is achieved, the time required for the polishing step will be long, thus lowering the productivity.

Further, considering the environmental burden by volatilization of $B_2O_3$, the content of $B_2O_3$ in the molten glass is preferably lower.

However, if the $B_2O_3$ content is low, it has been difficult to lower the coefficient of thermal expansion to the preferred range for the glass plate for TFT panels. Further, it has also been difficult to obtain a predetermined Tg, etc. while the increase in the viscosity is suppressed.

Patent Document 1: JP-A-2006-137631
Patent Document 2: JP-A-2006-169028

DISCLOSURE OF THE INVENTION

Object to be Accomplished by the Invention

As a result of extensive studies, the present inventors have found that in the above-described heat treatment at low temperature, the compaction (heat shrinkage) of glass at low temperature may greatly influence the film formation quality (film formation pattern accuracy) on a glass substrate.

In order to solve the above problems of prior art, the object of the present invention is to provide a glass plate for display panels which contains an alkali metal oxide and has a low $B_2O_3$ content and wherein at a time of heat treatment (specifically heat treatment in a step of forming a gate insulating film) at a low temperature (from 150 to 300° C.) in the process for producing TFT panels, the compaction is small, particularly a glass substrate for display panels, which can be preferably used as a glass substrate for large TFT panels (for example, a size with one side being 2 m or longer), a process for producing it and a process for producing a TFT panel by using such a glass plate.

Means to Accomplish the Object

To accomplish the above object, the present invention provides a glass plate for display panels, which comprises, as a glass matrix composition as represented by mass% based on oxide:
$SiO_2$ 50.0 to 73.0,
$Al_2O_3$ 6.0 to 20.0,
$B_2O_3$ 0 to 2.0,
MgO 4.2 to 9.0,
CaO 0 to 6.0,
SrO 0 to 2.0,
BaO 0 to 2.0,
MgO+CaO+SrO+BaO 6.5 to 11.3,
$Li_2O$ 0 to 2.0,
$Na_2O$ 2.0 to 18.0,
$K_2O$ 0 to 13.0, and
$Li_2O$ +$Na_2O$+$K_2O$ 8.0 to 18.0,
and has a heat shrinkage (C) of at most 20 ppm.

Effects of the Invention

When the glass plate for display panels in the present invention is heat-treated at a low temperature (150 to 300° C.) in the process for producing TFT panels, the compaction is small, and slippage of the film formation pattern on the glass substrate hardly occurs. Accordingly, the glass plate of the present invention can be preferably used as a glass substrate particularly for large size TFT panels, and it is possible to cope with the low temperature heat treatment in recent years.

Further, the glass plate of the present invention for display panels has a low $B_2O_3$ content, whereby volatilization of $B_2O_3$ is small at the time of production of glass. Accordingly, the glass plate is excellent in homogeneity and flatness, and after a glass plate is formed, only a low degree of polishing of the glass plate surface is required, thus leading to excellent productivity.

Further, the glass plate for display panels of the present invention contains an alkali component, whereby its starting material is easily melted, and its production is easy.

Further, as a preferred embodiment (hereinafter referred to as "first embodiment"), the glass plate for display panels of the present invention has a low density at a level of at most 2.46 g/cm$^3$, such being particularly preferred from a viewpoint of reducing weight or suppressing breakage at a time of transportation.

Further, as another preferred embodiment (hereinafter referred to as "second embodiment"), the glass plate for display panels of the present invention has an average coefficient of thermal expansion from 50 to 350° C. of at most $83 \times 10^{-7}$/° C., and accordingly the dimensional change in a process for producing panels is small, and the influence over the display quality by thermal stress at the time of use of the panels is small. Thus, the glass plate of the present invention is particularly preferred in the display quality.

Further, the glass plate for display panels of the present invention is a glass which is suitable for low temperature treatment in the heat treatment step in TFT process, namely the heat treatment at a temperature of from 150 to 300° C., such being effective for saving energy in TFT process.

The glass plate for display panels of the present invention is suitable as a glass substrate for TFT panels, but it can be used as a substrate also for other displays, such as a plasma display panel (PDP) and an inorganic electroluminescence display. For example, when it is used as a glass plate for PDP, since it has a low coefficient of thermal expansion as compared with a conventional glass plate for PDP, breakage of glass in the heat treatment step can be suppressed.

Further, the glass plate for display panels of the present invention can be used for application other than display panels. It can be used, for example, as a glass plate for solar battery substrates.

BRIEF DESCRIPTION OF THE DRAWINGS

FIG. 1 is a schematic cross-sectional view showing a gate insulating film formed on a surface of a glass plate in a process of forming an array substrate of a TFT panel in relation to one embodiment of the present invention.

BEST MODE FOR CARRYING OUT THE INVENTION

Now, the glass plate for display panels of the present invention will be described.

The glass plate for display panels of the present invention, comprises, as a glass matrix composition as represented by mass % based on oxide:

$SiO_2$ 50.0 to 73.0,
$Al_2O_3$ 6.0 to 20.0,
$B_2O_3$ 0 to 2.0,
MgO 4.2 to 9.0,
CaO 0 to 6.0,
SrO 0 to 2.0,
BaO 0 to 2.0,
MgO+CaO+SrO+BaO 6.5 to 11.3,
$Li_2O$ 0 to 2.0,
$Na_2O$ 2.0 to 18.0,
$K_2O$ 0 to 13.0, and
$Li_2O+Na_2O+K_2O$ 8.0 to 18.0,
and has a heat shrinkage (C) of at most 20 ppm.

First, the compaction will be described.

The compaction means the heat shrinkage of glass caused by relaxation of the glass structure at the time of heat treatment.

In the present invention, the heat shrinkage (C) (compaction (C)) means a shrinkage (ppm) in a distance between indentations obtained in such a manner that a glass plate is heated to the transition temperature Tg+50° C., held for one minute and then cooled to room temperature at 50° C./min, whereupon indentations are impressed at two portions with a predetermined distance on the surface of the glass plate, and then the glass plate is heated to 300° C., held for one hour and then cooled to room temperature at 100° C./hour.

The compaction (C) will be described more specifically.

In the present invention, the compaction (C) means a value measured by a method described below.

First, a glass plate to be measured is melted at 1,600° C., and the molten glass is cast, formed into a plate shape and then cooled. The obtained glass plate is subjected to polishing to obtain a sample of 100 mm×20 mm×2 mm.

Then, the obtained glass plate is heated to the transition temperature Tg+50° C., held at this temperature for one minute and then cooled to room temperature at a temperature-lowering rate of 50° C./min. Then, indentations are impressed at two portions in the long side direction with a distance A (A=90 mm) on the surface of the glass plate.

Then, the glass plate is heated to 300° C. at a temperature-increasing rate of 100° C./hour (=1.6° C./min), held at 300° C. for one hour, and then cooled to room temperature at a temperature-lowering rate of 100° C./hour. Then, the distance between the indentations are measured again, which is regarded as B. From A and B thus obtained, the compaction (C) is calculated by means of the following formula. Here, A and B are measured by an optical microscope.

$$C \text{ [ppm]} = (A-B)/A \times 10^6$$

The reason why the composition of the glass plate for display panels of the present invention is limited to the above is as follows.

$SiO_2$: $SiO_2$ is a component to form a skeleton of glass, and if its content is less than 50.0mass % (hereinafter simply represented as %), the heat resistance and the chemical durability of the glass tends to be low, and the coefficient of thermal expansion may be increased. On the other hand, if it exceeds 73.0%, problems will arise such that the high temperature viscosity of the glass is increased, thus impairing the melting property.

Further, for the first embodiment in which the density is at most 2.46 g/cm$^3$, the content of $SiO_2$ is preferably from 65.0 to 73.0%, more preferably from 66.0 to 72.0%, further preferably from 67.0 to 71.0%.

Further, for the second embodiment in which the average coefficient of thermal expansion from 50 to 350° C. is at most $83 \times 10^{-7}$/° C., the content of $SiO_2$ is preferably from 50.0 to 65.0%, more preferably from 54.0 to 64.0%, further preferably from 57.0 to 64.0%.

$Al_2O_3$: $Al_2O_3$ increases the glass transition temperature, improves the heat resistance and the chemical durability and increases the Young's modulus. If its content is less than 6.0%, the glass transition temperature tends to be low. On the other hand, if it exceeds 20.0%, the high temperature viscosity of the glass may be increased, and the melting property is likely to be impaired. Further, the devitrification temperature may be increased, and the forming properties are likely to be impaired.

Further, for the first embodiment in which the density is at most 2.46 g/cm³, the content of Al₂O₃ is preferably from 6.0 to 15.0%, more preferably from 7.0 to 12.0%, further preferably from 8.0 to 10.0%.

Further, for the second embodiment in which the average coefficient of thermal expansion from 50 to 350° C. is at most $83\times10^{-7}$/° C., the content of Al₂O₃ is preferably from 15.0 to 20.0%, more preferably from 16.0 to 20.0%, further preferably from 17.0 to 19.0%.

B₂O₃: The glass plate for display panels of the present invention has a B₂O₃ content as low as at most 2%. Accordingly, when glass is melted in the production of a glass plate, volatilization of B₂O₃ is small in a melting step, a refining step and a forming step, particularly in a melting step and a refining step, and a glass plate to be produced is excellent in homogeneity and flatness. As a result, when the glass plate is used as a glass plate for TFT panels which requires a high degree of flatness, the degree of polishing the glass can be made small as compared with a conventional glass plate for display panels.

Further, considering the environmental burden by volatilization of B₂O₃, the B₂O₃ content is preferably lower.

Further, for the first embodiment in which the density is at most 2.46 g/cm³, the content of B₂O₃ is preferably from 0 to 1.0%, more preferably from 0 to 0.5%, and it is further preferred that substantially no B₂O₃ is contained.

Further, for the second embodiment in which the average coefficient of thermal expansion from 50 to 350° C. is at most $83\times10^{-7}$/° C., the content of B₂O₃ is preferably from 0 to 1.0%, more preferably from 0 to 0.5%, and it is further preferred that substantially no B₂O₃ is contained.

Here, in the present invention, "substantially no . . . is contained" means that the component is not contained except for inevitable impurities included from a starting material or the like, that is, it is not contained on purpose.

MgO: MgO is contained since it has an effect to lower the viscosity at a time of melting glass thereby to accelerate melting. However, if its content is less than 4.2%, the high temperature viscosity of the glass tends to be increased, thus impairing the melting property. On the other hand, if its content exceeds 9.0%, the coefficient of thermal expansion and the compaction (C) may be increased.

Further, for the first embodiment in which the density is at most 2.46 g/cm³, the content of MgO is preferably from 5.0 to 9.0%, more preferably from 5.0 to 8.0%, further preferably from 6.0 to 8.0%.

Further, for the second embodiment in which the average coefficient of thermal expansion from 50 to 350° C. is at most $83\times10^{-7}$/° C., the content of MgO is preferably from 4.2 to 8.0%, more preferably from 4.2 to 7.0%, further preferably from 4.2 to 6.5%.

CaO: CaO may be contained since it has an effect to lower the viscosity at a time of melting glass thereby to accelerate melting. However, if its content exceeds 6.0%, the coefficient of thermal expansion of the glass and the compaction (C) are likely to be increased.

Further, for the first embodiment in which the density is at most 2.46 g/cm³, the content of CaO is preferably from 0 to less than 2.0%, more preferably from 0 to 1.0%, and it is further preferred that substantially no CaO is contained.

Further, for the second embodiment in which the average coefficient of thermal expansion from 50 to 350° C. is at most $83\times10^{-7}$/° C., the content of CaO is preferably from 2.0 to 6.0%, more preferably from 3.0 to 5.0%, further preferably from 4.0 to 5.0%.

SrO: SrO may be contained since it has an effect to lower the viscosity when glass is melted thereby to accelerate melting. However, if its content exceeds 2%, the coefficient of thermal expansion of the glass and the compaction (C) is likely to be increased.

Further, for the first embodiment in which the density is at most 2.46 g/cm³, the content of SrO is preferably from 0 to 1.0%, more preferably from 0 to 0.5%, and it is further preferred that substantially no SrO is contained.

Further, for the second embodiment in which the average coefficient of thermal expansion from 50 to 350° C. is at most $83\times10^{-7}$/° C., the content of SrO is preferably from 0 to 1.0%, more preferably from 0 to 0.5%, and it is further preferred that substantially no SrO is contained.

BaO: BaO may be contained since it has an effect to lower the viscosity when glass is melted thereby to accelerate melting. However, if its content exceeds 2%, the coefficient of thermal expansion of the glass plate and the compaction (C) are likely to be increased.

Further, for the first embodiment in which the density is at most 2.46 g/cm³, the content of BaO is preferably from 0 to 1.0%, more preferably from 0 to 0.5%, and it is further preferred that substantially no BaO is contained.

Further, for the second embodiment in which the average coefficient of thermal expansion from 50 to 350° C. is at most $83\times10^{-7}$/° C., the content of BaO is preferably from 0 to 1.0%, more preferably from 0 to 0.5%, and it is further preferred that substantially no BaO is contained.

MgO, CaO, SrO and BaO have an effect to lower the viscosity of the glass at the melting temperature thereby to accelerate melting. Therefore, they are contained in a total amount of 6.5%. However, if their total content exceeds 11.3%, the coefficient of thermal expansion of the glass and the compaction (C) are likely to be increased.

Further, for the first embodiment in which the density is at most 2.46 g/cm³, the total content of MgO, CaO, SrO and BaO is preferably from 6.5 to 10.0%, more preferably from 6.5 to 9.0%, further preferably from 7.0 to 8.0%.

For the second embodiment in which the average coefficient of thermal expansion from 50 to 350° C. is at most $83\times10^{-7}$/° C., the total content of MgO, CaO, SrO and BaO is preferably from 6.5 to 11.0%, more preferably from 7.0 to 11.0%, further preferably from 8.0 to 10.0%.

Li₂O: Li₂O may be contained since it has an effect to lower the viscosity of the glass at the melting temperature thereby to accelerate melting. However, if the content of Li₂O exceeds 2%, the glass transition temperature may be lowered.

Further, for the first embodiment in which the density is at most 2.46 g/cm³, the content of Li₂O is preferably from 0 to 1.0%, more preferably from 0 to 0.5%, and it is further preferred that substantially no Li₂O is contained.

Further, for the second embodiment in which the average coefficient of thermal expansion from 50 to 350° C. is at most $83\times10^{-7}$/° C., the content of Li₂O is preferably from 0 to 1.0%, more preferably from 0 to 0.5%, and it is further preferred that substantially no Li₂O is contained.

Na₂O: At least 2.0% of Na₂O is contained, since it has an effect to lower the viscosity of the glass at the melting temperature thereby to accelerate melting. However, if the content of Na₂O exceeds 18.0%, the coefficient of thermal expansion may be high.

Further, for the first embodiment in which the density is at most 2.46 g/cm³, the content of Na₂O is preferably from 3.0 to 17.0%, more preferably from 5.0 to 16.0%, further preferably from 5.0 to 15.5%.

Further, for the second embodiment in which the average coefficient of thermal expansion from 50 to 350° C. is at most $83\times10^{-7}/°$ C., the content of $Na_2O$ is preferably from 2.0 to 12.0%, more preferably from 2.5 to 11.5%, further preferably from 2.5 to 5.0%.

$K_2O$: From 0 to 13.0% of $K_2O$ is contained, since it has the same effect as $Na_2O$. However, if the content of $K_2O$ exceeds 13.0%, the coefficient of thermal expansion may be high.

Further, for the first embodiment in which the density is at most 2.46 g/cm$^3$, the content of $K_2O$ is preferably from 0 to 12.0%, more preferably from 0 to 8.0%, further preferably from 0 to 3.0%.

Further, for the second embodiment in which the average coefficient of thermal expansion from 50 to 350° C. is at most $83\times10^{-7}/°$ C., the content of $K_2O$ is preferably from 0 to 12.0%, more preferably from 0 to 11.0%, further preferably from 5 to 11.0%.

$Li_2O$, $Na_2O$ and $K_2O$: $Li_2O$, $Na_2O$ and $K_2O$ are contained in the total content of at least 8.0% since they sufficiently lower the viscosity of glass at the melting temperature. However, if the total content exceeds 18.0%, the coefficient of thermal expansion may be high.

Further, for the first embodiment in which the density is at most 2.46 g/cm$^3$, the total content of $Li_2O$, $Na_2O$ and $K_2O$ is preferably from 10.0 to 18.0%, more preferably from 10.0 to 17.0%, further preferably from 13.0 to 17.0%.

Further, for the second embodiment in which the average coefficient of thermal expansion from 50 to 350° C. is at most $83\times10^{-7}/°$ C., the total content of $Li_2O$, $Na_2O$ and $K_2O$ is preferably from 8.0 to 17.0%, more preferably from 8.0 to 15.0%, further preferably from 10.0 to 15.0%.

The glass plate for display panels of the present invention may contain other components in addition to the above matrix composition within a range not to impair the glass substrate. Specifically, it may contain $SO_3$, F, Cl and $SnO_2$ in the total content of at most 2% so as to improve the melting property of glass and the refining property.

Further, it may contain $ZrO_2$, $Y_2O_3$, $La_2O_3$, $TiO_2$ and $SnO_2$ in the total content of at most 5% so as to improve the chemical durability of the glass. Among them, $Y_2O_3$, $La_2O_3$ and $TiO_2$ contribute also to an improvement in the Young's modulus of glass.

Further, it may contain a colorant such as $Fe_2O_3$ or $CeO_2$ so as to adjust the color tone of the glass. The content of such a colorant is preferably at most 1 mass % in total.

Further, the glass plate for display panels of the present invention preferably contains substantially no $As_2O_3$ nor $Sb_2O_3$ considering the environmental burden. Further, it preferably contains substantially no ZnO considering to carry out a float process stably.

The glass plate for display panels of the present invention has at most 20 ppm of the compaction (C). Further, the compaction (C) is preferably at most 15 ppm, more preferably at most 10 ppm.

Further, the $B_2O_3$ content is low, whereby volatilization of $B_2O_3$ is small at the time of production of glass. Accordingly, the glass plate is excellent in homogeneity and is excellent in flatness, and after a glass plate is formed, only a low degree of polishing of the glass plate surface is required, thus leading to excellent productivity.

Further, the glass plate contains an alkali component, whereby its starting material is easily melted, and its production is easy. Further, when $SO_3$ is used as a refining agent, the refining effect is excellent, and the bubble quality is excellent.

Further, the glass plate of the present invention is suitable as a glass substrate for TFT panels, and can be used as a substrate for other displays such as plasma display panels (PDP) and an inorganic electroluminescence displays. For example, when it is used as a glass plate for PDP, since it has a low coefficient of thermal expansion as compared with a conventional glass plate for PDP, breakage of glass in the heat treatment step can be suppressed.

Further, the glass plate of the present invention can be used for application other than display panels. It can be used, for example, as a glass plate for solar battery substrates.

The glass plate for display panels of the present invention has a low density. The density is generally about at most 2.51 g/cm$^3$. In the after-mentioned embodiment 1 which is a preferred embodiment of the present invention, the density is made to be at most 2.46 g/cm$^3$.

The glass plate for display panels of the present invention has an average coefficient of thermal expansion from 50 to 350° C. of at most $86\times10^{-7}/°$ C. In the after-mentioned second embodiment which is a preferred embodiment of the present invention, the average coefficient of thermal expansion is made to be at most $83\times10^{-7}/°$ C.

Now, the first embodiment and the second embodiment which are preferred embodiments of the glass plate of the present invention are as follows.

First Embodiment

A glass plate for display panels, which comprises, as a glass matrix composition as represented by mass% based on oxide:
$SiO_2$ 65.0 to 73.0,
$Al_2O_3$ 6.0 to 15.0,
$B_2O_3$ 0 to 1.0,
MgO 5.0 to 9.0,
CaO 0 to less than 2.0,
SrO 0 to 1.0,
BaO 0 to 1.0,
MgO+CaO+SrO+BaO 6.5 to 10.0,
$Li_2O$ 0 to 1.0,
$Na_2O$ 3.0 to 17.0,
$K_2O$ 0 to 12.0, and
$Li_2O+Na_2O+K_2O$ 10.0 to 18.0,
and has a heat shrinkage (C) of at most 20 ppm and a density of at most 2.46 g/cm$^3$.

The density is preferably at most 2.44 g/cm$^3$, more preferably at most 2.42 g/cm$^3$.

Since the glass plate of the present invention for display devices which has the above glass matrix composition in the first embodiment has a low density at a level of at most 2.46 g/cm$^3$, the weight of the glass can be reduced, and breakage at a time of transportation can be suppressed.

Second Embodiment

A glass plate for display panels, which comprises, as a glass matrix composition as represented by mass % based on oxide:
$SiO_2$ 50.0 to 65.0,
$Al_2O_3$ 15.0 to 20.0,
$B_2O_3$ 0 to 1.0,
MgO 4.2 to 8.0,
CaO 2 to 6.0,
SrO 0 to 1.0,
BaO 0 to 1.0,
MgO+CaO+SrO+BaO 6.5 to 11.0,
$Li_2O$ 0 to 1.0,
$Na_2O$ 2.0 to 12.0,
$K_2O$ 0 to 12.0, and
$Li_2O+Na_2O+K_2O$ 8.0 to 17.0, and has a heat shrinkage (C) of at most 20 ppm and an average coefficient of thermal expansion from 50 to 350° C. of at most $83 \times 10^{-7}$/° C.

The average coefficient of thermal expansion is preferably at most $75 \times 10^{-7}$/° C., more preferably at most $70 \times 10^{-7}$/° C., further preferably at most $60 \times 10^{-7}$/° C. Further, the average coefficient of thermal expansion is preferably at least $50 \times 10^{-7}$/° C.

In the second embodiment of the glass plate of the present invention for display panels having such a glass matrix composition, since the average coefficient of thermal expansion from 50 to 350° C. is at most $83 \times 10^{-7}$/° C., the change in dimensions in a process for producing panels is small, and the influence over display quality by thermal stress at the time of use panels is small, and accordingly display quality is preferred.

The allowable value of the change in dimensions of a substrate in a heat treatment step carried out in production of TFT panels varies depending on the size of the TFT panels, and it can be properly selected depending on the size of the TFT panels (for example one side being 2 m or longer).

Now, the process for producing the glass plate of the present invention will be described.

To produce the glass plate of the present invention, a melting/refining step and a forming step are carried out in the same manner as in production of a conventional glass plate. Here, the glass plate of the present invention is an alkali glass substrate containing an alkali metal oxide ($Na_2O$, $K_2O$), and accordingly $SO_3$ can effectively be used as a refining agent, and float process is suitable as a forming method.

In a process for producing a glass plate for display panels, as a method of forming glass into a plate shape, preferred is to employ float process capable of easily and stably forming a glass plate having a large area, along with the production of a large-sized liquid crystal TV, etc., in recent years.

A preferred embodiment of the process for producing a glass plate of the present invention will be described.

First, molten glass obtained by melting starting materials is formed into a plate shape. For example, starting materials are blended to have a composition of a glass plate to be obtained, and the starting materials are continuously charged to a melting furnace and heated to about 1,450 to 1,650° C. to obtain molten glass. Then, the molten glass is formed into a glass plate in a ribbon shape by applying float process for example.

Then, the glass plate in a ribbon shape is withdrawn from the float process furnace, cooled to a room temperature state by a cooling means and cut to obtain a glass plate for display panels. The cooling means is a cooling means which fulfills an average cooling rate represented by $(T_H-T_L)/t$ of from 10 to 300° C./min, where $T_H$ (° C.) is the surface temperature of the glass plate in a ribbon shape withdrawn from the float process furnace, $T_L$ (° C.) is the room temperature, and t (min) is the time over which the surface temperature of the glass plate in a ribbon shape drops from $T_H$ to $T_L$. A specific cooling means is not particularly limited, and a known cooling method may be employed. For example, a method of using a heating furnace having a temperature gradient may be mentioned.

$T_H$ is the glass transition temperature Tg+20° C., specifically, preferably from 540 to 730° C.

The average cooling rate is preferably from 15 to 150° C./min, more preferably from 20 to 80° C./min, furthermore preferably from 40 to 60° C./min. By the above glass plate production process, a glass plate having a compaction (C) of at most 20 ppm can easily be obtained.

Now, a process for producing a TFT panel, which comprises a film forming step of forming a gate insulating film of an array substrate on the surface of the glass plate of the present invention for display panels will be described.

The process for producing a TFT panel of the present invention is not particularly limited so long as it comprises a film forming step of increasing the temperature of a film forming region on the surface of the glass plate of the present invention for display panels to a temperature within a range of from 150 to 300° C. (hereinafter referred to as a film forming temperature), and holding the glass plate at the film forming temperature for from 5 to 60 minutes to form the array substrate gate insulating film on the film forming region. The film forming temperature is preferably from 150 to 250° C., more preferably from 150 to 230° C., furthermore preferably from 150 to 200° C. Further, the time during which the glass plate is held at the film forming temperature is preferably from 5 to 30 minutes, more preferably from 5 to 20 minutes, furthermore preferably from 5 to 15 minutes.

The film formation of the gate insulating film is carried out within a range of the above film forming temperature and the holding time, and the glass plate undergoes heat shrinkage during the film formation. Here, once the glass plate underwent heat shrinkage, depending on the subsequent cooling conditions (such as the cooling rate), the above results of heat shrinkage are not remarkably influenced. The glass plate of the present invention for display panels has a low compaction (C), and accordingly the heat shrinkage of the glass plate is small, and slippage of the film formation pattern hardly occurs.

The film formation in the film forming step can be achieved, for example, by a known CVD method.

According to the process for producing a TFT panel of the present invention, an array substrate can be obtained by a known method. Further, using the array substrate, a TFT panel can be produced by the following known procedure.

That is, a TFT panel can be produced by a series of steps comprising an alignment treatment step of forming an alignment film on each of the array substrate and a color filter substrate and carrying out rubbing, a bonding step of bonding the TFT array substrate and the color filter substrate with high precision having a predetermined gap held, a separation step of separating cells into a predetermined size from the substrate, an injection step of injecting liquid crystal to the separated cells, and a polarizing plate bonding step of bonding a polarizing plate to the cells.

EXAMPLES

Now, the present invention will be described in further detail with reference to Examples and Comparative Examples. However, it should be understood that the present invention is by no means restricted to such specific Examples.

Working Examples (Examples 1 to 13) for the glass plate of the present invention for display panels and Comparative Examples (Examples 14 to 16) are described.

Starting materials of the respective components were blended to achieve a desired composition as identified by mass % in Table 1. 0.1 part by mass of a sulfate as calculated as $SO_3$ was added to 100 parts by mass of the starting materials of the above composition, and the mixture was heated by using a platinum crucible at a temperature of 1,600° C. for 3 hours and melted. For melting, a platinum stirrer was inserted, and stirring was carried out for one hour to homogenize glass. Then, the resulting molten glass was cast, formed into a plate shape and then annealed.

Of the glass thus obtained, the density, the average coefficient of thermal expansion (unit: $\times 10^{-7}$/° C.), glass transition temperature Tg (unit: ° C.), the temperature $T_2$ (unit: ° C.) at which the viscosity of the molten glass becomes $10^2$ dPa·s as the standard temperature for melting, the temperature $T_4$ (unit: °C.) at which it becomes $10^4$ dPa·s as the standard temperature for forming glass, and the compaction (C) were measured and shown in Table 1.

Methods for measuring the respective physical properties are shown below.

Density: About 20 g of a glass block containing no bubbles was subjected to measurement using a simple densitometer by Archimedes' Principle.

Viscosity: Viscosities were measured by using a rotation viscometer, and the temperature $T_2$ at which the viscosity became $10^2$ dPa·s and the temperature $T_4$ at which the viscosity became $10^4$ dPa·s were measured.

Compaction (C): Measured by the above-described method for measuring the compaction (C).

Further, in Tables, "-" means that no measurement was carried out.

The remaining amount of $SO_3$ in the glass was from 100 to 500 ppm.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| $SiO_2$ | (%) | 67.5 | 70.4 | 69.5 | 59.5 | 58.5 | 61.9 | 59.7 | 57.4 |
| $Al_2O_3$ | (%) | 8.3 | 8.6 | 8.4 | 18.0 | 18.1 | 18.4 | 18.3 | 18.2 |
| $B_2O_3$ | (%) | 0 | 0 | 0 | 0 | 0 | 0 | 0 | 0 |
| MgO | (%) | 7.3 | 7.6 | 6.7 | 4.5 | 5.2 | 6.2 | 6.1 | 6.1 |
| CaO | (%) | 0 | 0 | 0 | 3.4 | 4.0 | 4.6 | 4.6 | 4.6 |
| SrO | (%) | 0 | 0 | 0 | 0 | 0 | 0 | 0 | 0 |
| BaO | (%) | 0 | 0 | 0 | 0 | 0 | 0 | 0 | 0 |
| MgO + CaO + SrO + BaO | (%) | 7.3 | 7.6 | 6.7 | 7.9 | 9.2 | 10.8 | 10.7 | 10.7 |
| $Li_2O$ | (%) | 0 | 0 | 0 | 0 | 0 | 0 | 0 | 0 |
| $Na_2O$ | (%) | 5.0 | 13.4 | 15.4 | 4.5 | 4.3 | 2.7 | 3.4 | 4.2 |
| $K_2O$ | (%) | 11.9 | 0 | 0 | 10.2 | 9.9 | 6.2 | 7.9 | 9.5 |
| $Li_2O + Na_2O + K_2O$ | (%) | 16.9 | 13.4 | 15.4 | 14.7 | 14.2 | 8.9 | 11.3 | 13.7 |
| $ZrO_2$ | (%) | 0 | 0 | 0 | 0 | 0 | 0 | 0 | 0 |
| Density | (g/cm³) | (2.39) | (2.44) | (2.45) | (2.44) | (2.47) | (2.47) | (2.48) | 2.50 |
| Average coefficient of thermal expansion | ($\times 10^{-7}$/°C.) | 86 | 76 | (83) | (83) | (80) | (62) | (71) | (80) |
| Tg | (°C.) | 630 | 618 | (572) | (567) | (668) | (701) | (686) | (670) |
| $T_2$ | (°C.) | (1688) | 1597 | (1585) | (1505) | (1667) | (1687) | (1659) | 1667 |
| $T_4$ | (°C.) | (1271) | 1177 | (1119) | (1090) | (1241) | (1271) | (1247) | 1258 |
| Compaction (C) | (ppm) | 6 | 7 | 6 | 12 | At most 20 | 18 | 16 | 16 |

| | | Ex. 9 | Ex. 10 | Ex. 11 | Ex. 12 | Ex. 13 | Ex. 14 | Ex. 15 | Ex. 16 |
|---|---|---|---|---|---|---|---|---|---|
| $SiO_2$ | (%) | 61.8 | 61.6 | 60.6 | 59.4 | 63.4 | 72.5 | 57.7 | 59.3 |
| $Al_2O_3$ | (%) | 18.3 | 18.7 | 18.7 | 18.8 | 18.8 | 1.0 | 6.9 | 18.8 |
| $B_2O_3$ | (%) | 0 | 0 | 0 | 0 | 0 | 0 | 0 | 0 |
| MgO | (%) | 5.3 | 4.7 | 5.4 | 6.3 | 5.5 | 2.5 | 2.0 | 8.8 |
| CaO | (%) | 4.0 | 3.5 | 4.1 | 4.7 | 4.1 | 9.5 | 5.0 | 4.0 |
| SrO | (%) | 0 | 0 | 0 | 0 | 0 | 0 | 7.0 | 0 |
| BaO | (%) | 0 | 0 | 0 | 0 | 0 | 0 | 8.0 | 0 |
| MgO + CaO + SrO + BaO | (%) | 9.3 | 8.2 | 9.5 | 11.0 | 9.6 | 12.0 | 22.0 | 12.8 |
| $Li_2O$ | (%) | 0 | 0 | 0 | 0 | 0 | 0 | 0 | 0 |
| $Na_2O$ | (%) | 3.2 | 11.5 | 11.2 | 10.8 | 8.3 | 14.0 | 4.3 | 2.0 |
| $K_2O$ | (%) | 7.3 | 0 | 0 | 0 | 0 | 0.5 | 6.0 | 4.5 |
| $Li_2O + Na_2O + K_2O$ | (%) | 10.5 | 11.5 | 11.2 | 10.8 | 8.3 | 14.5 | 10.3 | 6.5 |
| $ZrO_2$ | (%) | 0 | 0 | 0 | 0 | 0 | 0 | 3.0 | 0 |
| Density | (g/cm³) | (2.45) | (2.47) | (2.49) | (2.51) | (2.47) | 2.49 | 2.77 | (2.53) |
| Average coefficient of thermal expansion | ($\times 10^{-7}$/°C.) | (67) | (75) | (75) | (75) | (63) | 87 | 83 | (59) |
| Tg | (°C.) | (692) | (642) | (644) | (647) | (674) | 550 | 631 | (712) |
| $T_2$ | (°C.) | (1709) | (1591) | (1559) | (1527) | (1630) | 1460 | 1521 | (1584) |
| $T_4$ | (°C.) | (1278) | (1177) | (1161) | (1146) | (1220) | 1040 | 1166 | (1222) |
| Compaction (C) | (ppm) | At most 20 | At most 20 | At most 20 | At most 20 | At most 20 | 30 | 50 | 26 |

Average coefficient of thermal expansion from 50 to 350° C.: Measurement was carried out by using a TMA (differential thermal dilatometer), and the average coefficient of thermal expansion from 50 to 350° C. was calculated by a method in accordance with JIS R3102 (1995).

Tg: Tg is a value measured by using a TMA (differential thermal dilatometer), and was obtained by a method in accordance with JIS R3103-3 (2001).

As evident from Table 1, glass in each of Working Examples (Examples 1 to 13) has a compaction (C) of at most 20 ppm, and accordingly when it is used as a glass plate for TFT panels, heat shrinkage of the glass plate can be suppressed in heat shrinkage at low temperature in a process for producing TFT panels.

Further, glass in each of Examples 1 to 3 which correspond to the preferred first embodiment of the glass of the present invention for display panels has a density of at most 2.46 g/cm³, and accordingly it can be used as a light weight glass plate for TFT panels.

Further, glass in each of Examples 4 to 13 which correspond to the preferred second embodiment of the glass of the present invention for display panels has an average coefficient of thermal expansion from 50 to 350° C. of at most 83×10⁻⁷/° C., and accordingly when it is used as a glass plate for TFT panels, the dimensional change in a process for producing TFT panels can be suppressed.

On the other hand, in Comparative Examples (Examples 14 to 16), the compaction (C) is high at a level of at least 26 ppm, and accordingly the heat shrinkage at a low temperature in a step for producing TFT panels may be influenced.

An example for production of the glass plate of the present invention for display panels will be shown.

Starting materials of the respective components are blended to achieve a glass composition as identified in Table 1, and the starting materials are continuously charged into a melting furnace and melted at a temperature of from 1,550 to 1,650° C. Then, the molten glass is continuously formed into a glass plate in a ribbon shape by float process, withdrawn from the float furnace at a glass plate surface temperature of the transition temperature Tg+20° C., and cooled by a cooling furnace at an average cooling rate of from 40 to 60° C./min until the surface temperature of the glass plate becomes room temperature ($T_L$=25° C.). Then, the glass plate is cut into predetermined dimensions (one side being 2 m or longer). A glass plate for display panels according to the present invention having a compaction (C) of at most 20 ppm can be obtained.

In a case where $SO_3$ is used as a refining agent in the step of melting glass in the present invention, an excellent refining effect is obtained, and glass with a small number of bubbles is obtained. Further, since the $B_2O_3$ content is at most 2%, glass excellent in flatness is obtained.

The glass plate of the present invention for display panels can be suitably used as a glass plate particularly for large-sized (one side being 2 m or longer) TFT panels.

An Example for production of the TFT panel of the present invention will be shown.

In an array substrate production process, the glass plate of the present invention is cleaned, and then gate electrodes and wiring patterns are formed.

Then, the glass plate is held at a film forming temperature of 250° C. for 15 minutes, and a gate insulating film is formed by the CVD method. FIG. 1 schematically shows a portion of the glass plate 1 on which the gate electrode 2, the wiring pattern 3 and the gate insulating film 4 are formed.

Then, an a-Si film is formed, and a channel protective film is formed, followed by patterning to form patterns.

Then, an N⁺ type a-Si film, pixel electrodes and contact patterns are formed.

Then, source/drain electrodes are formed, and then a protective film is formed to obtain a TFT array substrate. Then, a TFT panel is obtained by the following known steps.

That is, a TFT panel can be produced by a series of steps comprising an alignment treatment step of forming an alignment film on each of the above array substrate and a color filter substrate and carrying out rubbing, a step of bonding the TFT array substrate and the color filter substrate with high precision having a predetermined gap held, a separation step of separating cells into a predetermined size from the substrate, an injection step of injecting liquid crystal to the separated cells, and a polarizing plate bonding step of bonding a polarizing plate to the cells.

The glass plate of the present invention for display panels has a compaction (C) of at most 20 ppm, and accordingly even when it is subjected to such a process for producing a TFT panel, heat shrinkage is small, and slippage of the film formation pattern hardly occurs.

INDUSTRIAL APPLICABILITY

The glass plate of the present invention is suitable as a glass substrate for an liquid crystal display (LCD) panel, and it can be used as a substrate for other displays, such as a plasma display panel (PDP) and an inorganic electroluminescence display.

The entire disclosure of Japanese Patent Application No. 2008-110161 filed on Apr. 21, 2008 including specification, claims and summary is incorporated herein by reference in its entirety.

What is claimed is:

1. A glass plate comprising:
   as a glass matrix composition comprising, as represented by mass % based on oxide:
   $SiO_2$ 65.0 to 73.0,
   $Al_2O_3$ 6.0 to 15.0,
   $B_2O_3$ 0 to 1.0,
   MgO 5.0 to 9.0,
   CaO 0 to less than 2.0,
   SrO 0 to 1.0,
   BaO 0 to 1.0,
   MgO+CaO+SrO+BaO 6.5 to 10.0,
   $Li_2O$ 0 to 1.0,
   $Na_2O$ 3.0 to 17.0,
   $K_2O$ 0 to 12.0, and
   $Li_2O+Na_2O+K_2O$ 10.0 to 18.0,
   wherein the glass plate has a heat shrinkage (C) of at most 15 ppm and a density of at most 2.46 g/cm³.

2. A process for producing a glass plate, which comprises:
   melting a starting material to obtain a molten glass;
   forming the molten glass into a glass plate of a ribbon shape in a float process furnace; and
   cooling the glass plate by a cooling device to obtain the glass plate as defined in claim 1 in a room temperature state,
   wherein the cooling device is configured to fulfill an average cooling rate represented by $(T_H-T_L)/t$ of from 10 to 300° C./min, where $T_H$ (° C.) is a surface temperature of the glass plate withdrawn from the float process furnace, $T_L$ (° C.) is a room temperature, and t (min) is a time over which the surface temperature of the glass plate cooled by the cooling device drops from $T_H$ to $T_L$.

3. A process for producing a TFT panel, which comprises:
   a gate insulating film of an array substrate on a surface of a glass plate; and
   bonding the array substrate and a color filter substrate,
   wherein the forming of the gate insulating film comprises increasing a temperature of a film forming region on the surface of the glass plate as defined in claim 1 to a film forming temperature within a range of from 150 to 300° C., and holding the glass plate at the film forming temperature for from 5 to 60 minutes to form the gate insulating film on the film forming region.

4. The glass plate of claim 1, wherein the glass matrix composition comprises CaO in an amount of from 0 to 1.0%.

5. The glass plate of claim 1, wherein a total content of MgO, CaO, SrO and BaO in the glass matrix composition is from 7.0 to 8.0%.

6. The glass plate of claim 1, wherein the glass plate has the heat shrinkage (C) of at most 10 ppm.

7. A glass plate comprising:
a glass matrix composition comprising, as represented by mass % based on oxide:
$SiO_2$ 50.0 to 65.0,
$Al_2O_3$ 16.0 to 20.0,
$B_2O_3$ 0 to 1.0,
MgO 4.2 to 8.0,
CaO 2 to 6.0,
SrO 0 to 1.0,
BaO 0 to 1.0,
MgO+CaO+SrO+BaO 6.5 to 11.0,
$Li_2O$ 0 to 1.0,
$Na_2O$ 2.0 to 12.0,
$K_2O$ 0 to 12.0,
$Li_2O+Na_2O+K_2O$ 8.0 to 17.0,
wherein the glass plate has a heat shrinkage (C) of at most 20 ppm and an average coefficient of thermal expansion from 50 to 350° C. of at most $83\times10^{-7}$/° C.

8. The glass plate of claim 7, wherein the glass matrix composition comprises $Al_2O_3$ in an amount of from 17.0 to 19.0%.

9. A process for producing a glass plate, which comprises:
melting a starting material to obtain a molten glass;
forming the molten glass into a glass plate of a ribbon shape in a float process furnace; and
cooling the glass plate by a cooling device to obtain the glass plate as defined in claim 7 in a room temperature state,
wherein the cooling device is configured to fulfill an average cooling rate represented by $(T_H-T_L)/t$ of from 10 to 300° C./min, where $T_H$ (° C.) is a surface temperature of the glass plate withdrawn from the float process furnace, $T_L$ (° C.) is a room temperature, and t (min) is a time over which the surface temperature of the glass plate cooled by the cooling device drops from $T_H$ to $T_L$.

10. A process for producing a TFT panel, which comprises:
forming a gate insulating film of an array substrate on a surface of a glass plate; and
bonding the array substrate and a color filter substrate,
wherein the forming of the gate insulating film comprises increasing a temperature of a film forming region on the surface of the glass plate as defined in claim 7 to a film forming temperature within a range of from 150 to 300° C., and holding the glass plate at the film forming temperature for from 5 to 60 minutes to form the gate insulating film on the film forming region.

* * * * *